(No Model.) 6 Sheets—Sheet 1.
D. DI B. SAVORGNAN.
MAIL RECEIVING AND COLLECTING BOX.
No. 564,109. Patented July 14, 1896.
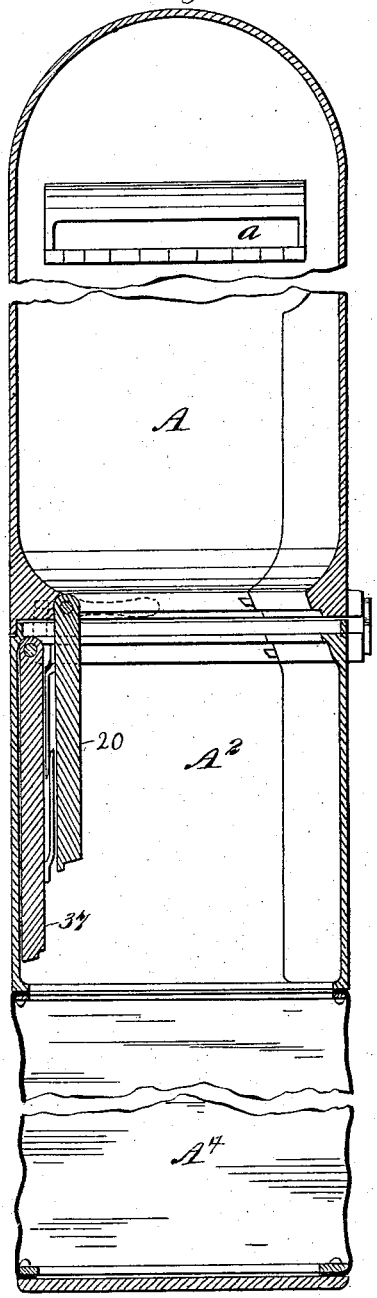
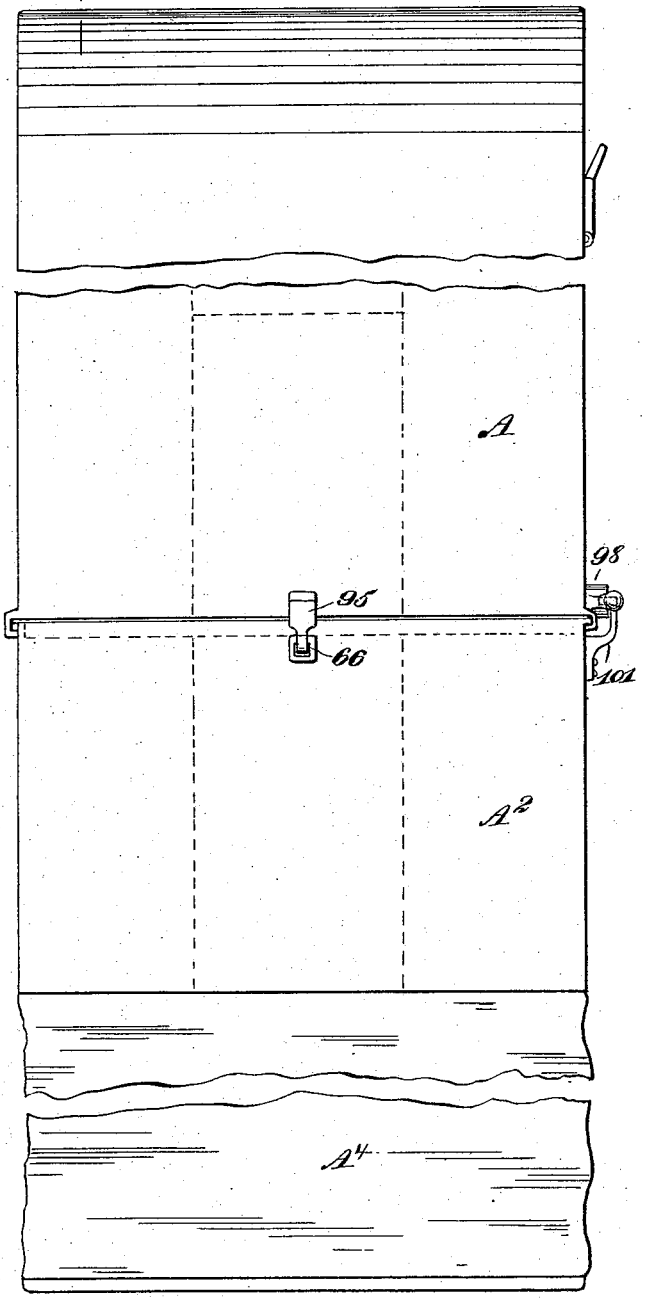
WITNESSES:
C. Neveux
C. R. Ferguson
INVENTOR
Detalmo di Brazza Savorgnan
BY
Munn & Co
ATTORNEYS.

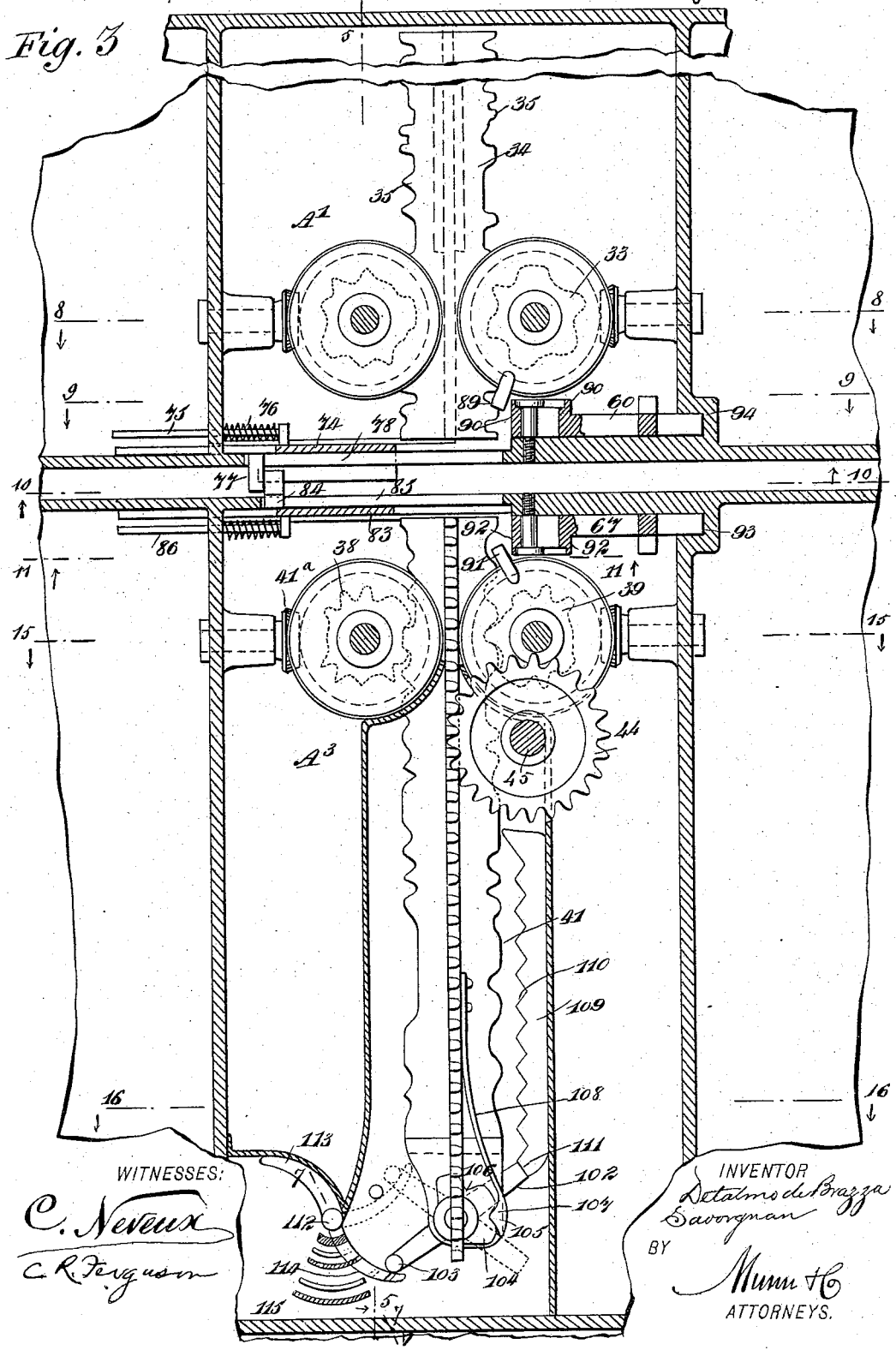

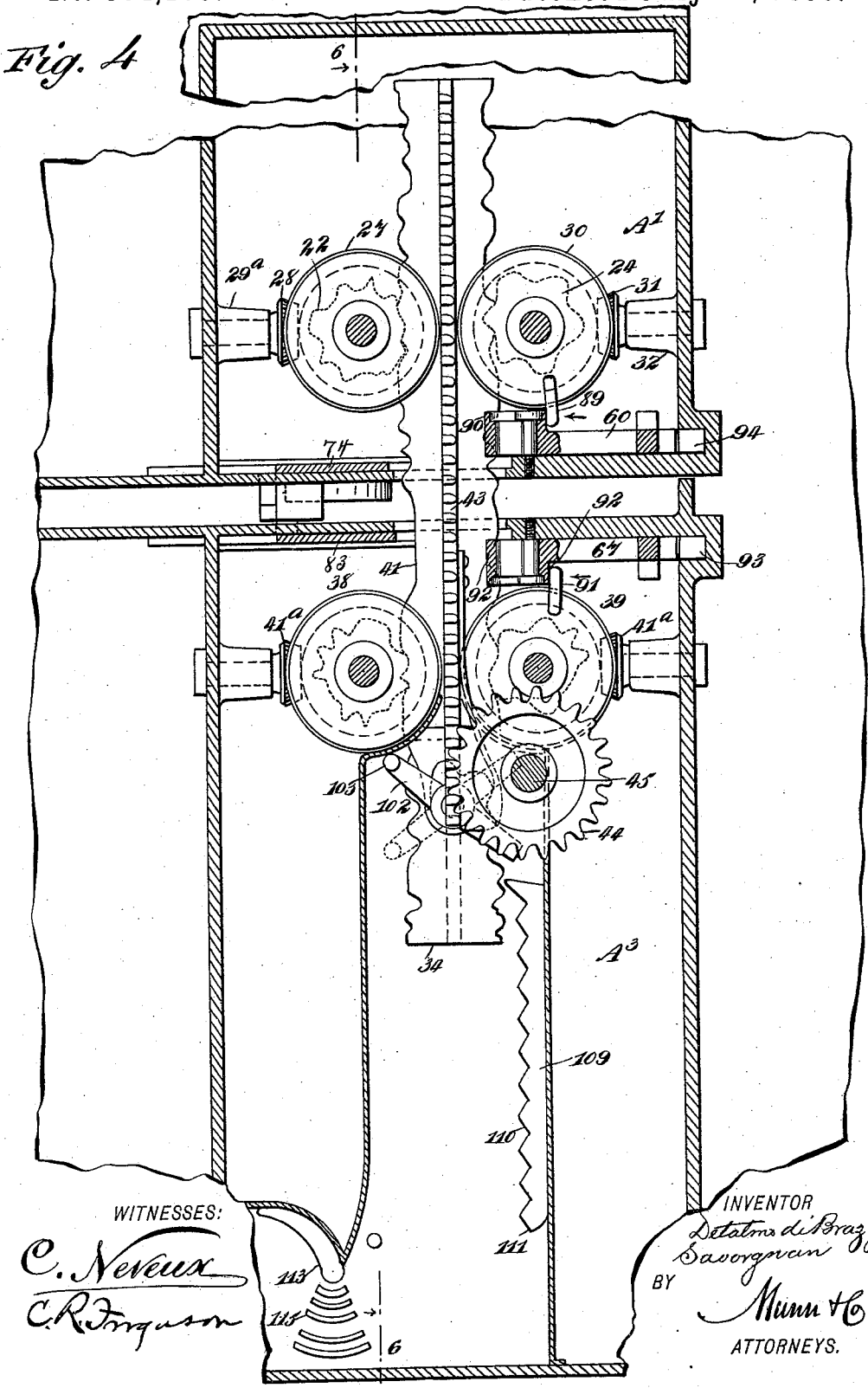

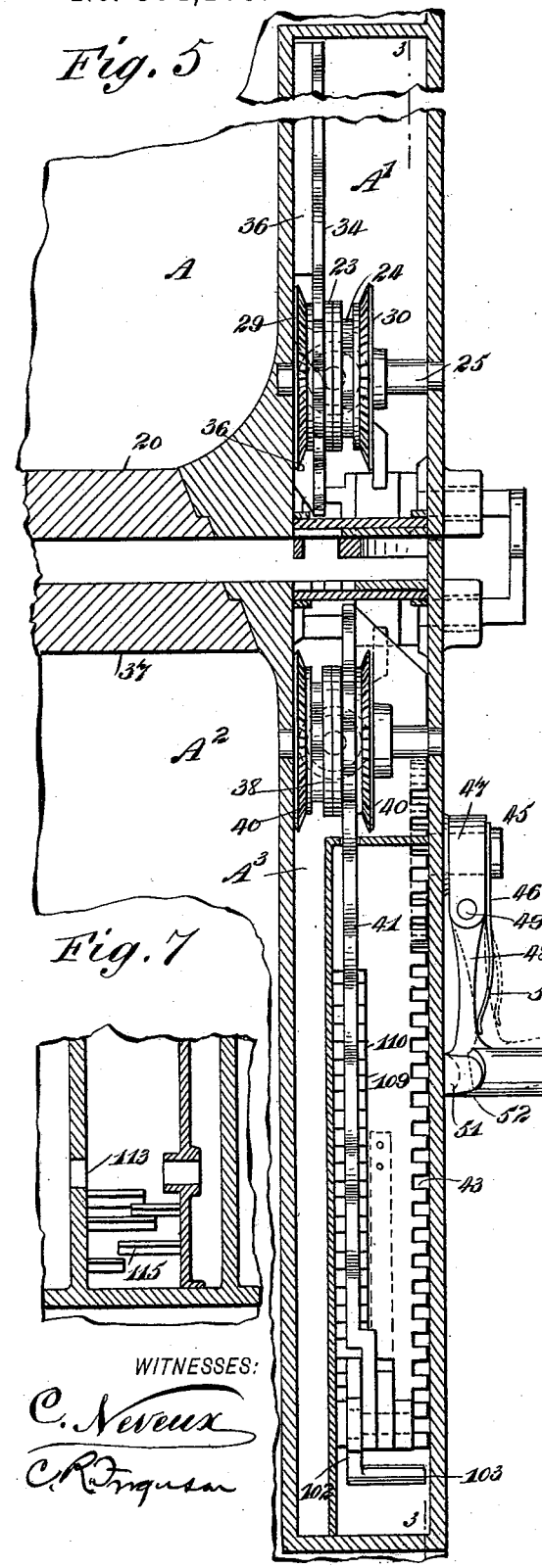

(No Model.) 6 Sheets—Sheet 5.
D. DI B. SAVORGNAN.
MAIL RECEIVING AND COLLECTING BOX.
No. 564,109. Patented July 14, 1896.
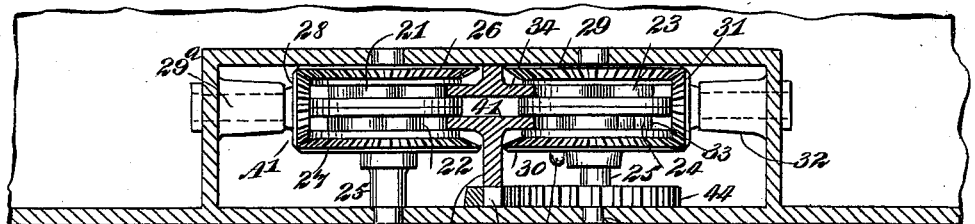
Fig. 8
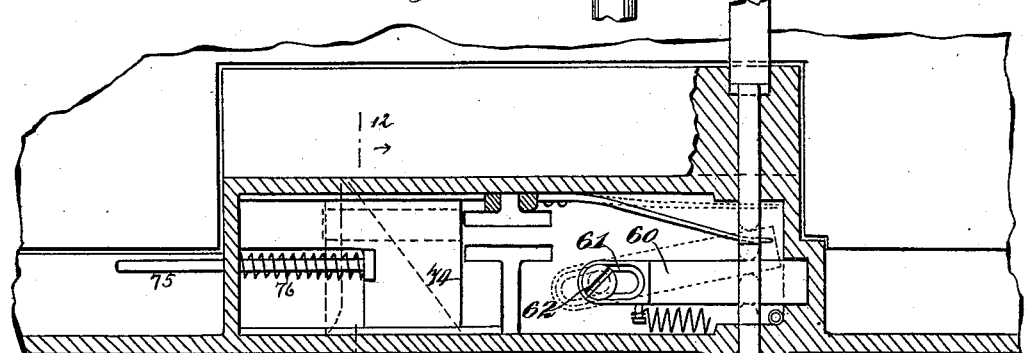
Fig. 9
Fig. 10  Fig. 12
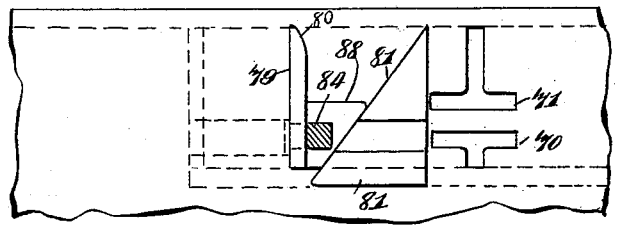
Fig. 13  Fig. 11
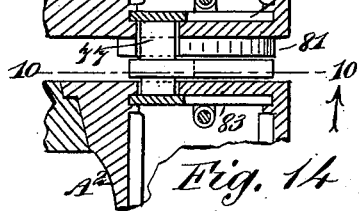
Fig. 14
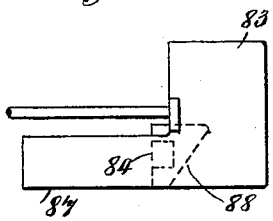
WITNESSES:
C. Neveux
C. R. Ferguson
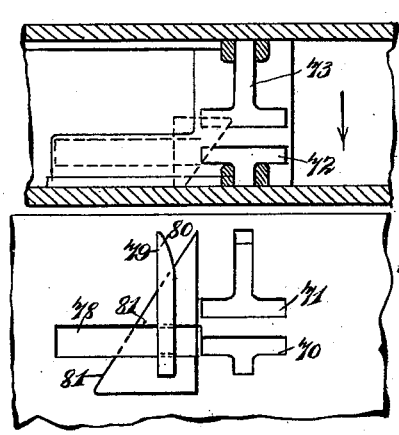
INVENTOR
Detalmo di Brazza Savorgnan.
BY Munn & Co.
ATTORNEYS.

(No Model.) 6 Sheets—Sheet 6.
D. DI B. SAVORGNAN.
MAIL RECEIVING AND COLLECTING BOX.
No. 564,109. Patented July 14, 1896.
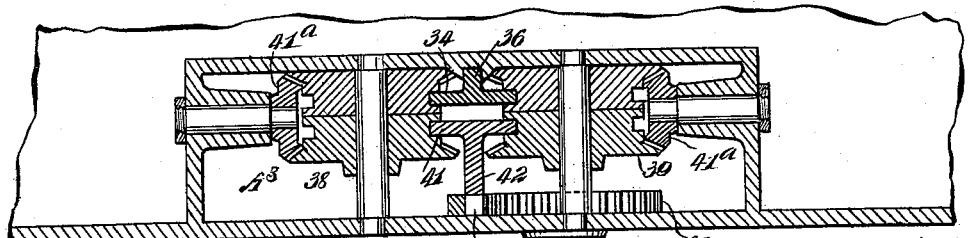
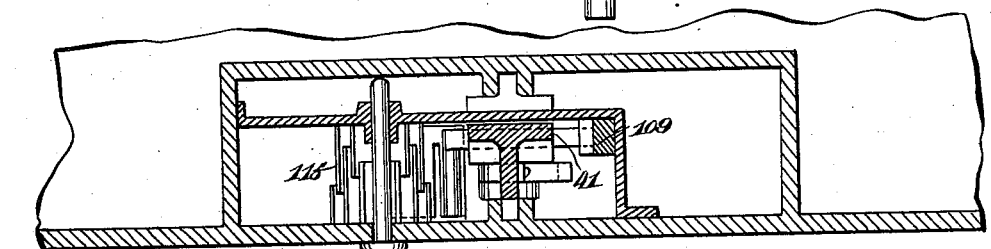
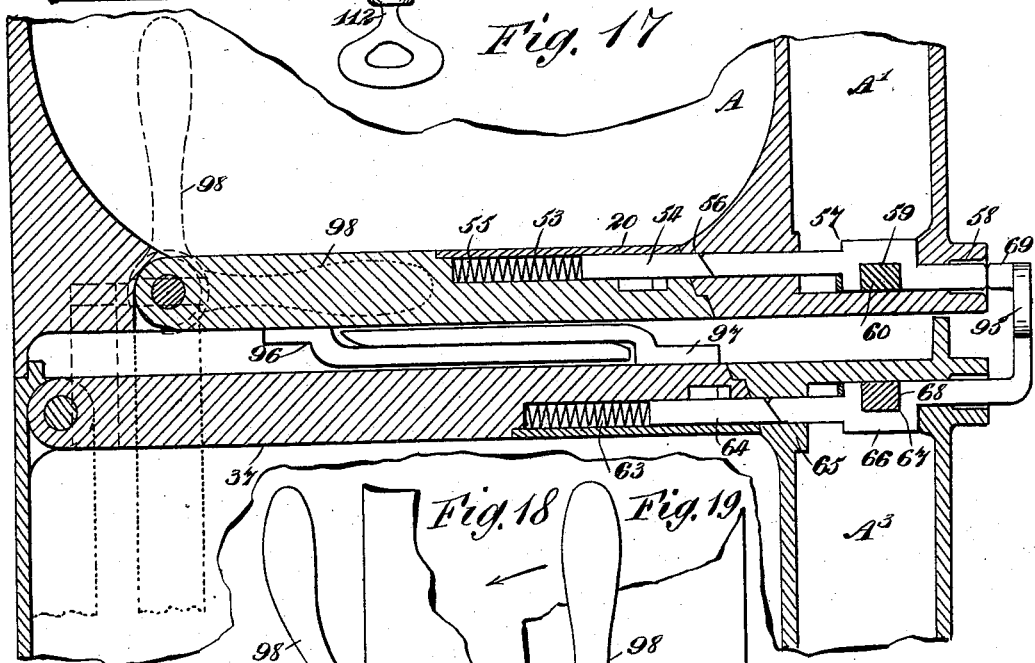

UNITED STATES PATENT OFFICE.

DETALMO DI BRAZZA SAVORGNAN, OF ROME, ITALY, ASSIGNOR TO CORA ANN SLOCOMB DI BRAZZA SAVORGNAN, OF MORUZZO, ITALY, AND NEW YORK, N. Y.

MAIL RECEIVING AND COLLECTING BOX.

SPECIFICATION forming part of Letters Patent No. 564,109, dated July 14, 1896.

Application filed August 12, 1895. Serial No. 559,060. (No model.)

*To all whom it may concern:*

Be it known that I, DETALMO DI BRAZZA SAVORGNAN, of Rome, Italy, have invented new and useful Improvements in Mail Receiving and Collecting Boxes, of which the following is a full, clear, and exact description.

This invention relates to boxes for receiving mail-matter; and the object is to provide a mail-box to be permanently attached in a suitable place, and to which access cannot be gained except upon the connection therewith of a receiving box or bag carrying certain locking mechanism adapted to coact with locking mechanism contained in the fixed box, and from which the receiving-box cannot be removed until both the said boxes shall have been again closed and locked, thereby preventing the unlawful abstraction of valuable letters or other mail-matter by the collecting agent.

I will describe a mail receiving and collecting box embodying my invention, and then point out the novel features in the appended claims.

Reference is to be had to the accompanying drawings, forming a part of this specification, in which similar characters of reference indicate corresponding parts in all the views.

Figure 1 is a front elevation of a mail receiving and collecting box embodying my invention. Fig. 2 is a vertical section thereof on the line 2 2 of Fig. 1. Fig. 3 is a vertical section on the line 3 3 of Fig. 5. Fig. 4 is a vertical section on the line 4 4 of Fig. 6. Fig. 5 is a vertical section on the line 5 5 of Fig. 3. Fig. 6 is a vertical section on the line 6 6 of Fig. 4. Fig. 7 is a detail section on the line 7 7 of Fig. 3. Fig. 8 is a horizontal section on the line 8 8 of Fig. 3. Fig. 9 is a horizontal section on the line 9 9 of Fig. 3. Fig. 10 is a bottom plan view, on the line 10 10 of Fig. 12, of a portion of the receiving-box. Fig. 11 is an inverted plan of the top portion of the collecting box or bag. Fig. 12 is a vertical section of a portion of the device, showing mechanism illustrated in plan in Figs. 10 and 11. Fig. 13 is a plan view of a slide employed in connection with the bag or collecting-box. Fig. 14 is a plan view of a slide employed in connection with the receiving-box. Fig. 15 is a transverse section on the line 15 15 of Fig. 3. Fig. 16 is a transverse section on the line 16 16 of Fig. 3. Fig. 17 is a vertical section showing the bottom of the collecting-box and the top of the receiving box or bag, and certain locking mechanism and doors connected therewith. Fig. 18 is a side elevation of a portion of the device, and Fig. 19 is a front view thereof.

Referring to the drawings, A designates a mailing-box adapted to be secured to any suitable support and having at one side a door-closed opening $a$ for the insertion of letters or other mail-matter, and having a hinged-bottom closure 20, provided with a locking mechanism, which will be hereinafter more fully described.

Within the front portion of the box A is formed a chamber A', and within this chamber A' are located two pairs of tumbler-wheels 21 22 and 23 24. The tumbler-wheels 21 22 are mounted loosely on a shaft 25, secured to the walls of the chamber A', and the tumbler-wheel 21 has rigidly secured to it a miter-gear 26, and a similar miter-gear 27 is rigidly attached to the tumbler-wheel 22. These miter-gears 26 27 are connected to rotate in opposite directions by means of a miter-pinion 28, having its shaft bearing in a hollow stud 29$^a$, extended from one of the end walls of the chamber A'. The tumbler-wheels 23 24 are respectively provided with miter-gears 29 30, connected by a pinion 31, having its shaft bearing in a hollow stud 32, extended from an end wall of the chamber A'. These several tumbler-wheels may be provided with any desired form of tumblers or cam projections 33, and the tumblers of one wheel may differ materially from those of the other wheel, so as to serve, substantially, in connection with sliding keys, as safety or combination locking devices.

34 designates a sliding key coacting with the tumbler-wheels 21 23. It has its edges provided with guards 35, corresponding to the tumblers on the tumbler-wheels with which they engage. This sliding key 34 has a longitudinal rib 36 on its rear side engaging in a vertical channel formed in the rear wall of the chamber A'. This sliding key 34 is of a sufficient length to impart during its vertical movement nearly a complete rotation to the tumbler-wheels 21 23.

$A^2$ is a collecting-box, preferably of rigid material, such as iron, in its upper portion, and which may have a flexible lower portion or bag $A^4$ attached to it, as clearly shown in Fig. 2. This collecting-box $A^2$ is provided with an inwardly-swinging cover 37, for closing an opening in the top of said box which is adapted to register with the opening in the mailing-box A, which is normally closed by the closure or cover 20. The box $A^2$ is provided at two of its upper opposite edges with flanges adapted to slide in grooves formed in flanges depending from opposite sides of the bottom of the box A.

In the front portion of the collecting-box $A^2$ is formed a chamber $A^3$, within which are mounted two pairs of tumbler-wheels 38 39 in a similar manner to the tumbler-wheels heretofore described in connection with the box A, and each is provided with a miter-gear, the miter-gear of each pair being connected to rotate in opposite directions by a miter-pinion $41^a$. These several tumbler-wheels 38 and 39 are provided on their periphery with tumbler or cam projections of any desired shape and number, and the outer tumblers of each pair of tumbler-wheels 38 and 39 are adapted to be engaged by a vertical sliding key 41, having guards on its edges formed similarly to the tumblers or projections on the wheels. The sliding key 41 is provided with a web 42, extended longitudinally thereof, and provided on its edge with rack-teeth 43, meshing with a pinion 44, mounted within the chamber $A^3$ on a shaft 45, extended outward through the front wall of the box $A^2$, and to the outer end of which is attached a crank 46. This crank 46 comprises two sections 47 48, one of which (47) is rigidly attached to the shaft 45, and the other section, 48, has pivotal connection 49 with the section 47, so that said section 48 may be swung slightly outward, with relation to the front of the box $A^2$, as indicated in dotted lines in Fig. 5. The section 48 is normally held in its position toward the front of the box $A^2$ by means of a spring 50, attached to the section 47, and bearing with its free end on the front face of the section 48. Extended outward from the front of the box $A^2$ are two lugs 51 52, between which the outer end of the crank may be passed to prevent the accidental rotation of said crank. The lug 51 is somewhat shorter than the lug 52, and the section 48 of the crank has sufficient outward movement to allow it to pass over the end of said lug 51, but it has not sufficient movement to pass the longer lug 52, which serves as a stop for the crank after it shall have completed its rotary movement in either direction. These several parts just described, and comprising the tumbler-wheels and sliding keys, are adapted to release locking devices for the closures 20 and 37, which I will now describe.

The free edge of the closure 20 is provided with an opening 53, within which slides a locking-bolt 54, and which is impelled outward by means of a spring 55. The outer end of this bolt 54 is adapted to engage in an opening 56, formed horizontally through the lower portion of the box A. A push-bar 57 has one end extended into this opening 56, and the other end is extended outward through an opening 58 in the outer wall of the box A, and between its ends within the chamber A' the said push-bar 57 is provided with a notch 59, the end walls of which are transversely rounded, as indicated in dotted lines in Fig. 9, and through this notch 59 a sliding and swinging bolt 60 is adapted to pass and lock the push-bar. This bolt 60, as plainly shown in Fig. 9, extends at right angles to the push-bar 57, and it has at its inner end an elongated opening 61, through which a screw or pivot 62 extends to an engagement with the bottom wall of the chamber A'.

The closure 37 is provided in its free edge with an opening 63, within which moves a spring-impelled bolt 64, adapted to engage in a horizontal opening 65 in the inner wall of the chamber $A^3$, and into this opening 65 one end of a push-bar 66 passes to engage with the end of the bolt 64. This push-bar 66 is provided with a notch 67, with which engages a bolt 68, pivoted to swing relatively to the top wall of the chamber $A^3$ in a manner similar to the bolt 60, above described. One end of the push-bar 66 extends outward through the front wall of the box $A^2$, and is extended upward and provided with a lug 69, adapted to engage with the outer end of the push-bar 57.

The bottom of the chamber A' is provided with openings 70 71, through which the respective keys 34 41 may pass in their longitudinal movement, and the top of the chamber $A^3$ is provided with similar openings 72 73 for the passage of said keys. The openings 70 71 are adapted to be normally closed by means of a slide 74, movable in suitable guideways and having a stem portion 75 extended through an opening in the inner end wall of the chamber A', and within the chamber this stem portion is provided with a spring 76, adapted to force the slide 74 forward over the openings 70 71. A lug 77 extends downward from the slide 74, through an opening 78 in the bottom of the chamber A'. Attached to the lug 77 and extended transversely to the slot 78 is a finger 79, having a cam-shaped end 80, and on the under side of the bottom of the box A and extended at each side of the slot 78 is an inclined cam 81. The slide 74 is provided with an extension 82, adapted to cover the slot 78 when the slide is in its closed position, thus preventing the entrance of dust and also preventing the introduction of a wire or other instrument for manipulating the locking devices.

A slide 83 is provided for the openings 72 73. The said slide 83 is movable in suitable guideways formed in the upper wall of the chamber $A^3$, and is provided with a lug 84, passing through a slot 85, formed in the upper wall of said chamber $A^3$, and it is also provided with a stem 86, passing through the inner wall of the chamber $A^3$, and having a spring surrounding it within said chamber, for the purpose of forcing the plate over the openings 72 73, and it is also provided with an extension 87, designed to cover the slot-opening 85. Mounted on an extension from the lug 84 is an inclined cam 88, adapted to engage with the inclined edge of the fixed cam 81.

Extended radially from the miter-gear 30 on the tumbler-wheel 24, is a lug 89, adapted to engage with an outward extension 90 on the sliding bolt 60, and a similar lug 91 is formed on the miter-gear attached to the outer tumbler-wheel of the pair 39. This lug 91 is adapted to engage with a projection 92 on the sliding bolt 67.

The operation of the locking mechanism for the closures 20 37 as so far described is as follows: When the collecting-box $A^2$ is slid into connection with the mailing-box A, the inclined cam 88 will engage with the inclined surface of the fixed cam 81, and upon moving thereon will cause the opening of the slide 83 to uncover the openings 72 73, and during this movement the lug 84 on the slide 83 will engage the finger 79 and cause the inward movement of the slide 74 to uncover the openings 70 71. Now the operator will draw the section 48 of the crank 46 outward sufficiently to release it from the lug 51, and then by rotating the crank until it shall be stopped by the lug 52, the sliding key 41 will be elevated, first imparting motion to the outer tumbler-wheels of the pairs 38 39, which through the miter-gear mechanism will impart a reverse rotary movement to the inner tumbler-wheels of said pairs, and during this movement of the key 41 the lug 91 upon nearly the complete rotation of the wheel to which it is attached will engage with the projection 92 on the bolt 67 and draw said bolt inward, to free it from a keeper 93, formed in an end wall of the chamber $A^3$, thus allowing the push-bar 66 to be moved inward, and upon a continued upward movement of the key 41 it will engage with the tumblers 22 24 and rotate the same, and the rotation of these tumbler-wheels 22 24 will rotate the tumblers 21 23 in the opposite direction, which will move the key 34 downward to engage with the rear tumblers of the pairs 38 39, and upon a rotary movement of the tumbler-wheel 24 the lug 89 will engage with a projection 90 on the sliding bolt 60 and move said bolt out of engagement with the keeper 94 in the end wall of the chamber A', so as to allow the longitudinal movement of the push-bar 57. After these bolts 59 67 shall have been released as described, an inward pressure on the outer end 95 of the push-bar 66 will move said bar 66 and also the bar 57 longitudinally inward, and these bars will force the bolts 64 54 out of the openings 65 56, thus releasing the closures 37 20 and allowing each of them to swing downward by gravity, and of course, while the closures are thus opened, the mail-matter previously placed in the box A will fall into the collecting-box $A^2$.

I provide means for causing the closures 20 37 to move in unison, and also means for preventing the removal of the box $A^2$ from the box A until after said closures shall have been completely closed. To the under side of the closure 20 is affixed a hook or finger 96, having its opening toward the front or free end of the closure, and the upper side of the closure 37 is provided with a similar hook 97, but extended with its opening in the opposite direction so that when the box $A^2$ is slid into engagement with the box A the said hooks 96 97 will engage their inner faces, as plainly indicated in Fig. 17. Obviously, when the closure 20 swings downward, the closure 37 will also swing downward with it, and when the closure 20 is drawn upward or closed, the said closure 37 will also be closed during the closing of the closure 20. One end of the shaft upon which the closure 20 is mounted is extended outward through a side wall of the box A, and to this extended end is affixed a crank-shaft 98, having a transverse groove 99 formed in its hub engaging with the shaft. When the doors are closed, this groove 99 will extend lengthwise of the movement of the box $A^2$, and also in the line of movement of a finger 100, extended inward from an arm 101, projected outward and upward from the outer side of the box $A^2$, but when said closures are open, the said groove 99 will be transverse to said finger 100 and the said finger will be rearward of the crank 98. Therefore the box $A^2$ cannot be drawn outward until after the said closures shall have been closed by turning the handle or crank 98 to its vertical position, as indicated in Figs. 18 and 19. After closing the closures 20 37, the crank 46 is rotated in the reverse direction, which causes the several parts comprising the keys and tumbler-wheels to assume their original or normal position, and then the box $A^2$ may be removed from the box A and carried to the office or distributing-station.

To prevent a second operation or upward movement of the key 41, and consequently the operation of the coacting locking devices, I provide means for locking the said key 41 in its downward position, and this locking mechanism can only be released by an authorized person having the proper key. As here shown, this means consists of a lever 102, pivoted between its ends to the lower end of the key 41, and having an arm 103 extended at right angles from one of its ends.

Upon the central portion of this lever 102 is secured a cam 104, having notches 105 106 in its periphery, and one of these notches is adapted to be engaged by a projection 107 on a spring 108, attached to the web portion 42 of the key 41, as plainly indicated in Fig. 3. 109 is a plate secured within the box A³, and having a serrated edge 110 in the line of movement of the end of the lever 102 opposite the arm 103, and said end of the lever 102 is adapted to engage with the lower end 111 of said plate 109 to secure the key 41 in its downward position. To release said lever to allow the key to operate, a key 112 is inserted through an opening 113 in the lower portion in the wall of the box A², and the wing 114, provided with suitable notches for passing guards 115, will engage the arm 103 of the lever and swing said lever to the position indicated in dotted lines in Fig. 3. This, of course, is done when the box A² is empty and the collector has the box in his charge for the collection of mail-matter. After swinging the lever into the position shown in dotted lines in Fig. 3, the projection 107 on the spring 108 will engage in the notch 106 of the cam 104, holding the said lever in this position until the end of the said lever shall have been drawn above the upper end of the plate 109 by the upward movement of the key 41. Then by the downward movement of the key 41 the end of the lever 102 will engage with the upper end of the plate 109, which will cause said lever to be rocked to the position shown in full lines in Fig. 3. Of course, the spring 108 will allow the end of the lever 102 to readily move over the serrations on the edge of the plate 109. After the key 41 shall have reached its lowermost position, the end of the lever will again engage with the lower end of the plate 109, as shown in full lines in Fig. 3, thus locking the key 41.

Having thus described my invention, I claim as new and desire to secure by Letters Patent—

1. A mail receiving and collecting box, comprising a box adapted to be placed in a fixed position, locking mechanism for the closure thereof, another box adapted to be engaged with the first-named box, locking mechanism for a closure in said other box, and means for operating the locking mechanisms of both boxes comprising oppositely-rotating tumbler-wheels and a key-plate for operating the same, substantially as specified.

2. In a mail-box, a locking device for the closure thereof, comprising a rotary tumbler-wheel, and a longitudinally-movable key-plate permanently engaging the said tumbler-wheel, substantially as specified.

3. A mailing device, comprising a fixed box having a closure for an opening in its lower side, a locking-bolt for said closure, pairs of tumbler-wheels in said box, the tumblers of each pair being hinged together to rotate in opposite directions, a device carried by one of the tumblers for moving the bolt of the closure, and a longitudinally-movable key-plate for operating the said tumbler-wheels, substantially as specified.

4. A locking mechanism for a mail or similar box, comprising pairs of tumbler-wheels, a longitudinally-movable key for turning one of said tumbler-wheels of each pair, and miter-gear mechanism operated by the tumbler-wheels engaged by the key to rotate the other tumbler-wheels of each pair in an opposite direction to that of the wheels engaged by the key, substantially as specified.

5. A mail receiving and collecting box, comprising a fixed box for receiving mail-matter, a portable box adapted to be engaged with the first-named box, an opening in the top of the portable box adapted to register with an opening in the bottom of the fixed box, closures for said openings, locking-bolts for said closures, and means for operating the bolts to release the closures, comprising tumbler-wheels in each of the boxes, and longitudinally-movable key-plates in each of the boxes adapted to engage with the tumbler-wheels in each of the boxes, substantially as specified.

6. A mail receiving and collecting device, comprising a fixed box having an opening through its bottom wall, a hinged closure for said opening, a portable box adapted to be engaged with the fixed box and having an opening in its top wall, a closure for said opening adapted to swing within the said portable box, a finger or plate on said closure having a sliding engagement with a similar finger or plate on the other closure, locking devices for each of said closures, and means comprising tumbler-wheels and longitudinally-movable key-plates engaged thereby, for simultaneously releasing both of the said closures, as set forth.

7. In a mail-box, the combination with a box having an opening, of a hinged closure for said opening, a spring-impelled sliding locking-bolt carried by said closure, a push-bar for moving said bolt in one direction, and a longitudinally-movable and swinging locking-bolt for said push-bar, substantially as specified.

8. A mail receiving and collecting box, comprising a fixed box having a door-closed opening in its bottom wall, a sliding locking-bolt carried by said door, a portable box adapted to be engaged by the first-named box and having a door-closed opening in its upper wall, a sliding bolt carried by the door for locking said door, and means for releasing both of said doors simultaneously, comprising push-bars for each of the bolts, one of said push-bars being extended outward through a wall of a box and having a part to engage the other bar, substantially as specified.

9. The combination of the fixed box having a door-closed opening in its bottom wall, a movable box adapted to be slid into engagement with said fixed box and having a door-closed opening in its top wall adapted to register with the opening in the first-named box, locking mechanism for said doors, a hand piece or crank on the shaft of one of the said doors, and a stop carried by one of the boxes adapted to engage with said crank or handle when said doors are open to prevent the removal of the movable box and also adapted to pass through a slot or opening in the said handle or crank, to allow the removal of the movable box after the said doors shall have been closed, substantially as specified.

10. A mail-collecting box having a door-closed opening in its top, a locking mechanism for said door comprising a bolt, tumbler-wheels journaled in said box and adapted to move the bolt in one direction, a key-plate for operating said tumbler-wheels, the said plate being in permanent connection with the wheels and a locking device for securing said key-plate in a position to prevent its movement to operate the tumbler-wheels, substantially as specified.

11. The combination, with a box and the tumbler-wheels therein, of the longitudinally-movable key-plate engaging the said tumbler-wheels, a rack on said key-plate, and a gear-wheel on a rotary shaft engaging the said rack, substantially as specified.

12. The combination with a box having a door-closed opening, of a locking mechanism for said door, comprising a tumbler-wheel, a longitudinally-movable key-plate engaging said tumbler-wheel, means for moving said key-plate, a lever pivoted to the key-plate and adapted to engage with the fixed portions within the box to lock said key-plate, and means for releasing said lever from said fixed portions, substantially as specified.

13. The combination of a fixed box having a door-closed opening in its bottom wall, a portable or movable box adapted to be engaged by the first-named box and having a door-closed opening in its top wall, locking mechanism for each of said doors comprising tumbler-wheels in each of the boxes, and a longitudinally-movable key in each of the boxes and engaging with the tumbler-wheels in its box and each of said keys being adapted to be engaged with tumbler-wheels in said other box, substantially as specified.

14. A locking mechanism for a mail-box, comprising tumbler-wheels loosely mounted on a shaft, a miter-gear on each of said tumbler-wheels, a miter-pinion meshing with said miter-wheels, and a key for rotating one of said tumbler-wheels through the medium of the miter-gears, substantially as specified.

15. A fixed box, having an opening in its bottom wall for the passage of a locking-key operating in said box, a portable box adapted to be slid into engagement with the fixed box and having an opening in its top wall for the passage of a key in said portable box, slide-plates for closing the openings in each of the said boxes, and means for moving said slide-plates to uncover the openings as the portable box is slid into engagement with the fixed box, substantially as specified.

16. The combination of a fixed box having openings in its bottom wall for the passage of operating-keys, a portable box adapted to be slid into engagement with the fixed box and having openings in its top for the passage of operating-keys, slide-covers for the openings in the respective boxes, a cam on one of said slides adapted to engage with a fixed portion when said portable box is moved into engagement with the fixed box, whereby said slide will be forced longitudinally to uncover the openings, and a cam-finger mounted on the slide for the openings in the other box and adapted to be engaged with a projection on the first-named slide, substantially as specified.

17. The combination, with a longitudinally-moving key-plate, of a lever fulcrumed in the lower end thereof, a notched plate on the said lever, a spring-pawl adapted to engage in either of said notches, and a fixed plate having a serrated edge and adapted to be engaged by the said lever for locking the key-plate in its normal position, substantially as specified.

18. The combination with a pair of tumbler-wheels, of a longitudinally-movable key-plate having its edges provided with projections or tumblers for engaging the projections or tumblers of the tumbler-wheels, a longitudinally-extended web on said key-plate, and a rack on said web adapted to be engaged by a gear-wheel, substantially as specified.

19. The combination, with the receiving-box having locking mechanism substantially as described, of a collecting-box adapted to be engaged therewith, locking mechanism substantially as described, for securing the cover of said locking mechanism, a vertically-movable key-plate for operating the rotary tumblers, a rack on one of said key-plates, a gear-wheel engaging the said rack, and a crank on the shaft of said gear-wheel, comprising two sections one movable relatively with the other, and stop-lugs on the collecting-box, for engaging the said crank, substantially as specified.

DETALMO DI BRAZZA SAVORGNAN.

Witnesses:
   JNO. M. RITTER,
   CLARENCE R. FERGUSON.